(12) United States Patent
Yi et al.

(10) Patent No.: US 9,248,729 B2
(45) Date of Patent: Feb. 2, 2016

(54) VEHICLE DOOR STRUCTURE

(71) Applicant: Nissan North America, Inc., Franklin, TN (US)

(72) Inventors: Austin Yi, Farmington Hills, MI (US); Scott Watson, Farmington Hills, MI (US)

(73) Assignee: Nissan North America, Inc., Franklin, TN (US)

(*) Notice: Subject to any disclaimer, the term of this patent is extended or adjusted under 35 U.S.C. 154(b) by 92 days.

(21) Appl. No.: 14/135,067

(22) Filed: Dec. 19, 2013

(65) Prior Publication Data

US 2015/0174993 A1 Jun. 25, 2015

(51) Int. Cl.
*B60J 5/00* (2006.01)
*B60J 10/04* (2006.01)
*B60J 10/00* (2006.01)
B60J 5/04 (2006.01)
B60J 1/00 (2006.01)

(52) U.S. Cl.
CPC .............. *B60J 10/041* (2013.01); *B60J 5/0411* (2013.01); *B60J 5/0463* (2013.01); *B60J 10/0094* (2013.01); *B60J 1/007* (2013.01); *B60J 5/048* (2013.01); *B60J 5/0413* (2013.01)

(58) Field of Classification Search
CPC .......... B60J 5/048; B60J 1/007; B60J 10/041; B60J 10/0094; B60J 5/0411; B60J 5/0463; B60J 5/0413
USPC .......................................... 296/146.2; 49/502
See application file for complete search history.

(56) References Cited

U.S. PATENT DOCUMENTS

| 5,379,553 A | 1/1995 | Kimura et al. |
| 5,651,217 A * | 7/1997 | Mesnel ........................... 49/441 |
| 8,037,640 B2 * | 10/2011 | Boddy et al. .................... 49/506 |
| 2008/0303306 A1 | 12/2008 | Hirooka et al. |

FOREIGN PATENT DOCUMENTS

| EP | 0257608 A2 | 3/1988 |
| EP | 1785302 A2 | 5/2007 |
| GB | 1197150 | 7/1970 |
| JP | H07-172179 A | 7/1995 |
| JP | H07-309139 A | 11/1995 |
| JP | H09-249029 A | 9/1997 |
| JP | H11-034664 A | 2/1999 |
| JP | 2008-074187 A | 4/2008 |

* cited by examiner

*Primary Examiner* — Joseph D Pape
*Assistant Examiner* — Dana Ivey
(74) *Attorney, Agent, or Firm* — Global IP Counselors, LLP (57) ABSTRACT

A vehicle door structure includes a panel and a bracket. A window opening in the panel has an edge extending along a lower periphery of the window opening from a first side to a second side of the window opening. The edge defines a seal supporting lip and a glass installation slot. The seal supporting lip extends from the first side of the window opening toward the second side of the window opening to a terminal end of the seal supporting lip. The glass installation slot begins at the terminal end of the seal supporting lip and ends proximate the second side of the window opening. The bracket is removably attached to the panel filling the glass installation slot. The bracket has a lip extension aligned with the seal supporting lip extending from the terminal end of the seal supporting lip to the second side of the window opening.

20 Claims, 7 Drawing Sheets

VEHICLE DOOR STRUCTURE

BACKGROUND

1. Field of the Invention

The present invention generally relates to a vehicle door structure. More specifically, the present invention relates to a vehicle door structure with a window opening that includes a seal support bracket that is removable from the vehicle door structure to allow installation and removal of window glass from the vehicle door structure.

2. Background Information

Vehicle door structures typically include a window opening with window glass that is movable between a first position where the window glass covers the window opening, to a second position where the window glass is moved into the vehicle door structure exposing the window opening. Installation and removal of the window glass requires dis-assembly of the vehicle door structure.

SUMMARY

One object of the disclosure is to provide a vehicle door structure with a removable bracket that allows for simple installation and removal of window glass from the vehicle door structure.

Another object of the disclosure is to provide a vehicle door structure with a removable bracket that rigidly supports a window seal on one side of the window glass.

Still another object of the disclosure is to provide a vehicle door structure with a removable bracket that supports a window seal in order to reduce vibration and noise infiltration into a passenger compartment of the vehicle.

In view of the state of the known technology, one aspect of the disclosure is directed to a vehicle door structure that includes a first panel and a support bracket. The first panel at least partially defines a first window opening and has a first edge portion extending along a lower periphery of the first window opening from a first side to a second side of the first window opening. The first edge portion defines a seal supporting lip and a glass installation slot. The seal supporting lip extends from the first side of the first window opening toward the second side of the first window opening to a terminal end of the seal supporting lip that is spaced apart from the second side of the first window opening. The glass installation slot begins at the terminal end of the seal supporting lip and ends proximate the second side of the first window opening. The support bracket is removably attached to the first panel substantially filling the glass installation slot. The support bracket has a lip extension aligned with the seal supporting lip that extends from the terminal end of the seal supporting lip to the second side of the first window opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
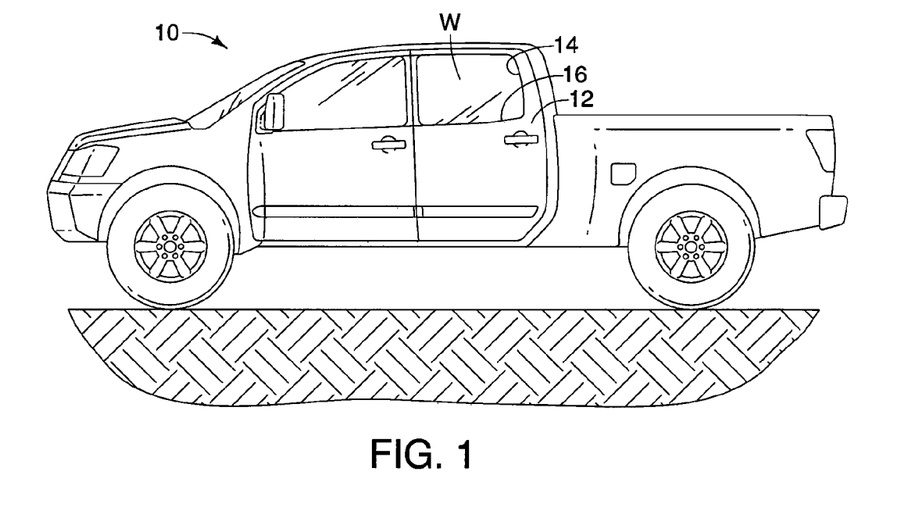
FIG. 1 is a side view of a vehicle that includes a door with a window opening that has a non-linear lower edge in accordance with one embodiment.
Figure 4:
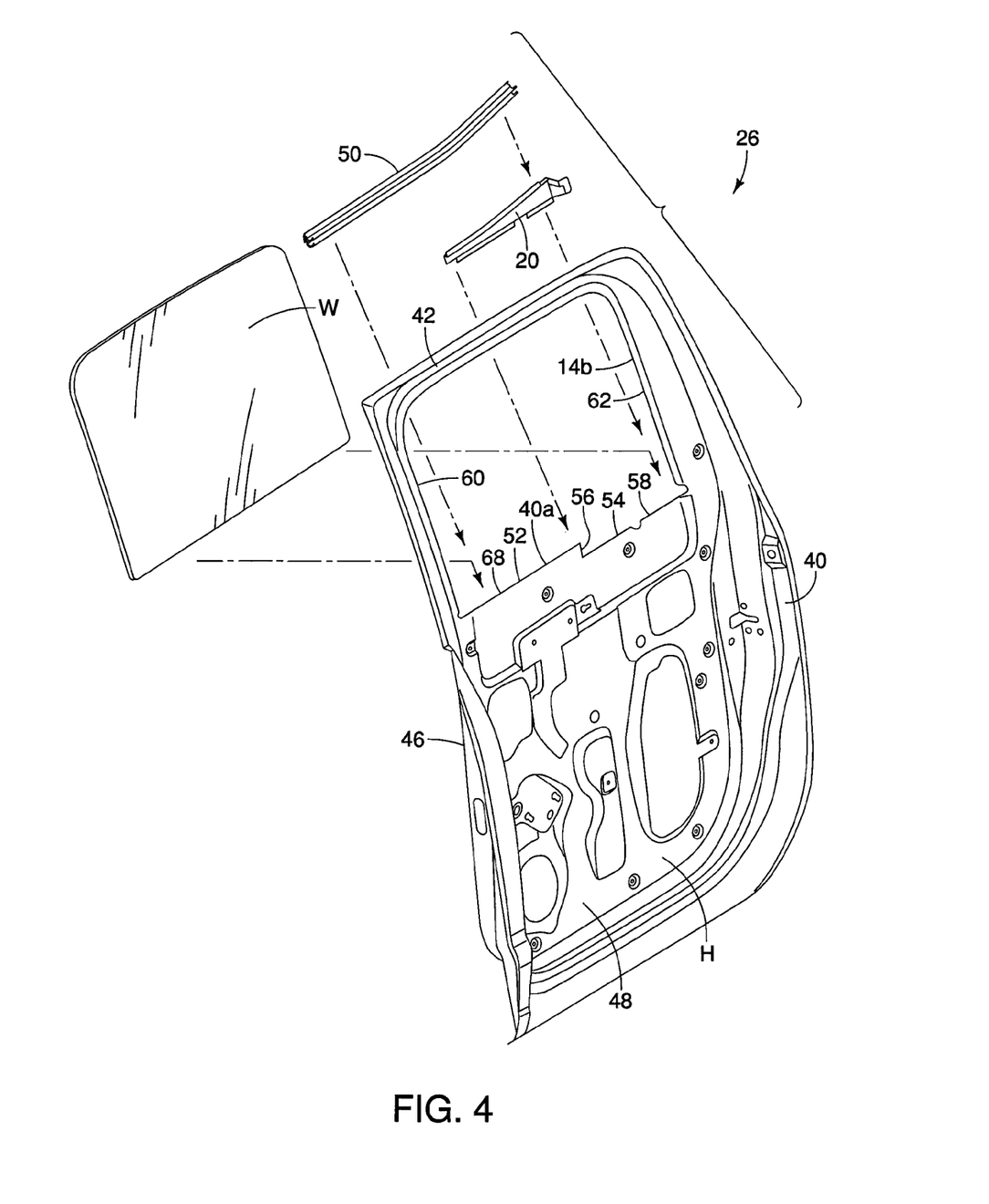
FIG. 4 is an exploded view of the inner panel of the door showing the window opening, a glass installation slot adjacent to the window opening, window glass, a seal member and a support bracket in accordance with the one embodiment.

Referring initially to FIG. 1, a vehicle 10 is illustrated in accordance with a first embodiment. The vehicle 10 includes a door 12 with a window opening 14 that has a non-linear bottom end 16. The non-linear bottom end 16 presents challenges with respect to installation and removal of window glass W from the door 12. As shown in FIG. 4, the door 12 includes a support bracket 20 that is removable, lending greater ease to the process of installing and removing of the window glass W from the door 12, as described in greater detail below.

Figure 2:
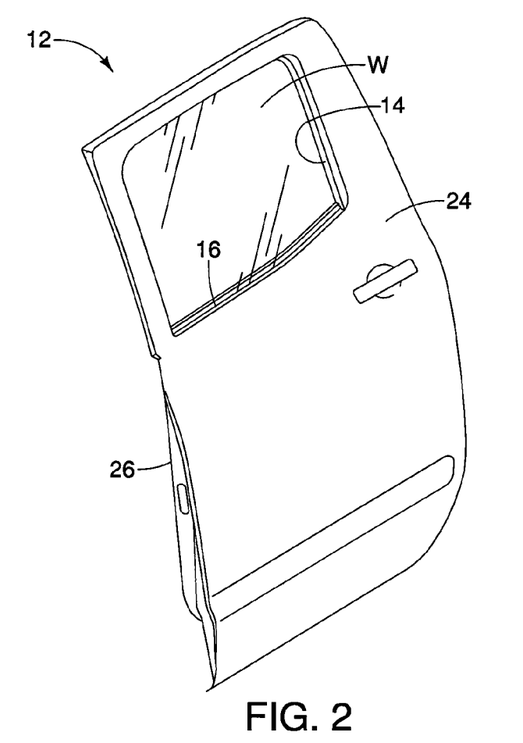
FIG. 2 is a perspective view of the door removed from the vehicle showing the window with the non-linear lower edge in accordance with the one embodiment.
Figure 3:
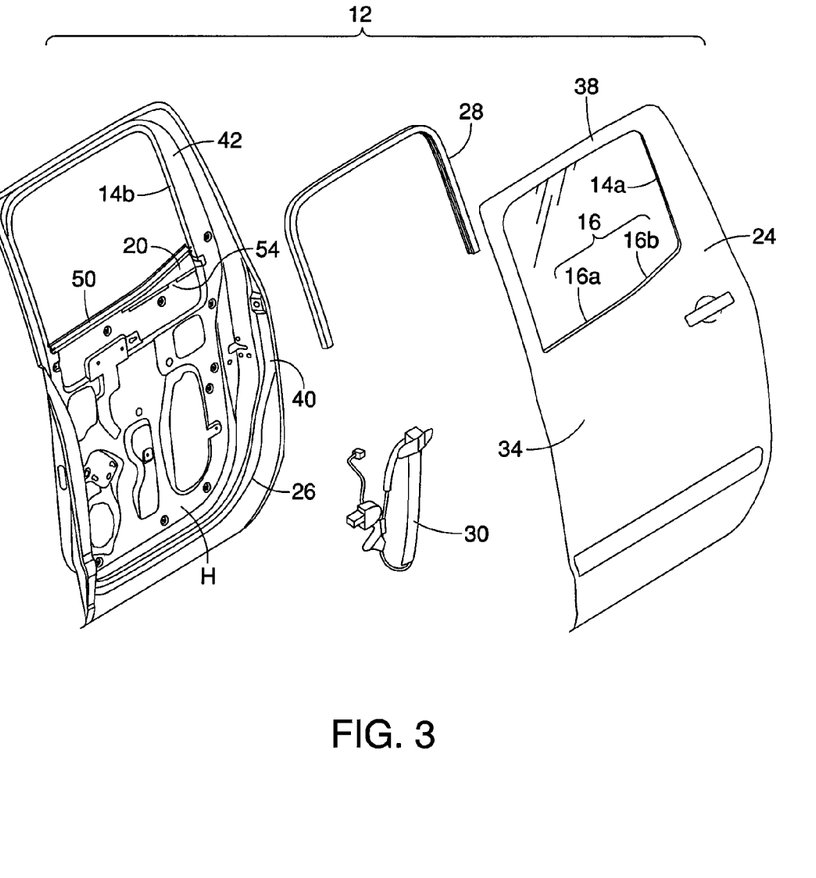
FIG. 3 an exploded view of the door removed from the vehicle showing an inner panel, a window channel, a window regulator and an outer panel in accordance with the one embodiment.

A description of the door 12 is now provided with specific reference to FIGS. 2 and 3. The door 12 basically includes an outer panel 24 (also referred to as a second panel) and an inner panel 26 (also referred to as a first panel) that are rigidly fixed to one another, with a window channel 28 and a window regulator 30 installed to the door 12 between the outer panel 24 and the inner panel 26. It should be understood from the drawings and the description herein that there are other elements and components included in the door 12, such as a latching mechanism (not shown), a locking mechanism (not shown) and a door handle. However, since these other elements and components are conventional features, further description is omitted for the sake of brevity.

The outer panel 24 is fixed to the outer periphery of the inner panel 26 by, for example, welding. There can be additional attachment areas within the door 12 that connect and fixedly attach the outer panel 24 to the inner panel 26 in a conventional manner, however description of these additional attachment areas is omitted for the sake of brevity.

The outer panel 24 includes a lower panel portion 34 and an upper window support portion 38. The lower panel portion 34 and the upper window support portion 38 can be welded to one another or can be unitarily formed as a monolithic one piece element. Similarly, the inner panel 26 includes a lower panel portion 40 and an upper window support portion 42 that is welded to the lower panel portion 40. However, it should be understood from the drawings and the description herein that the lower panel portion 40 and the upper window support portion 42 can also be unitarily formed as a monolithic one piece element.

The upper window support portion 38 of the outer panel 24 defines a window opening 14a, and the upper window support portion 40 of the inner panel 26 also defines a window opening 14b. The window openings 14a and 14b together define the window opening 14 of the door 12. The window opening 14a of the outer panel 24 has an overall shape that includes the non-linear bottom end 16. Specifically, an upper edge of the lower panel portion 34 defines a lower edge of the window opening 14a. The lower edge of the window opening 14a includes a straight section 16a and an inclined section 16b that together define the overall shape of the non-linear bottom end 16 of the window opening 14 of the door 12. Specifically, the inclined section 16b is angled upward in a rearward direction from the straight section 16a toward a rearward edge of the door 12.

The lower panel portion 34 of the outer panel 24 overlays the lower panel portion 40 of the inner panel 26 defining a hollow area H within the door 12 between the lower panel portion 34 and the lower panel portion 40. The window regulator 30 is installed within this hollow area H of the door 12 in a conventional manner. The window regulator 30 can be a manually operated mechanism for raising and lowering the window glass W, or can include an electric motor for raising and lowering the window glass W. Since the window regulator 30 is a conventional component, further description is omitted for the sake of brevity.

The window channel 28 is depicted as a single separate element that can be installed to the door 12 along with the window glass W. Alternatively, the window channel 28 can include a plurality of track elements that are welded or otherwise fixedly attached to the inner panel 26. The window channel 28 can be installed directly to the inner panel 26, or can be installed to one or both of the inner panel 26 and the outer panel 24. The window channel 28 is basically a track with recesses that receive respective edges of the window glass W such that the window glass W moves up and down along the track between an open position (a lower position) and a closed position (an upper position) in a conventional manner. The tracks of the window channel 28 are typically provided with a flexible sealing material that contacts the portion of the window glass W within the window channel 28, defining weather strips or weather seals. Since window channels are conventional features of vehicle doors, further description is omitted for the sake of brevity.

A description of the inner door panel 26 is now provided with specific reference to FIGS. 4-13. The window channel 28 is omitted from FIG. 4 to provide a clear view of the features of the inner door panel 26 and the support bracket 20.

The inner door panel 26 includes at least the following: an inboard surface 46 (FIGS. 6 and 7), an outboard surface 48 (FIGS. 4 and 8), the lower panel portion 40, the upper window support portion 42, the support bracket 20 and a seal member 50 (also referred to as a first seal member). The window glass W is shown in FIG. 4 but is omitted from FIGS. 5-12 to provide greater clarity.

An upper edge of the lower panel portion 40 defines a lower edge 40a of the window opening 14b of the inner panel 26. Specifically, the lower edge 40a of the window opening 14b includes a first edge portion 52, a second edge portion 54 and an upright edge portion 56. The first edge portion 52 of the lower panel portion 40 is parallel to the straight section 16a of the window opening 14a of the outer panel 24. The second edge portion 54 is basically parallel to the first edge portion 52 but is located vertically lower than the first edge portion 52. The upright edge portion 56 extends in a vertical direction from the second edge portion 54 up to the first edge portion 52. The second edge portion 54 and the upright edge portion 56 at least partially define a glass installation slot 58. The glass installation slot 58 is basically a gap or concaved area of the upper edge of the lower panel portion 40 that extends the lower boundary of the window opening 14b. In other words, a lower portion the window opening 14b of the inner panel 26 is increased in size with the glass installation slot 58 left uncovered.

Figure 6:
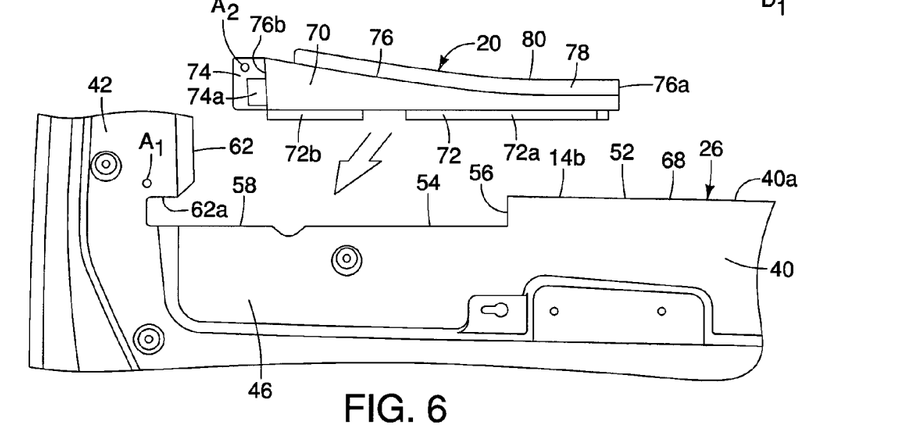
FIG. 6 is an exploded side view of a portion of the inner panel of the door showing the glass installation slot and the support bracket in accordance with the one embodiment.

As shown in FIG. 4, the window opening 14b has a front side 60 and a rear side 62. The first edge section 52 extends along a lower periphery of the window opening 14b of the inner panel 26 from the front side 60 of the window opening 14b toward (but spaced apart from) the rear side 62 of the window opening 14b. The first edge section 52 defines a first seal supporting lip 68 that extends from the front side 60 of the window opening 14b toward the rear side 62 of the window opening 14b and to the upright edge portion 56. The upright edge portion 56 defines a terminal end of the first seal supporting lip 68 and is spaced apart from the rear side 62 of the window opening 14b. The glass installation slot 58 begins at the upright edge portion 56 and extends to proximate the rear side 62 of the window opening 14b. At the intersection of the rear side 62 of the window opening 14b and the second edge section 54, a recess 62a is formed. The recess 62a is open to the glass installation slot 58, as shown in FIG. 6. At a lower region of the rear side 62 above the recess 62a, the upper window support portion 42 includes a first aperture $A_1$.

Figure 7:
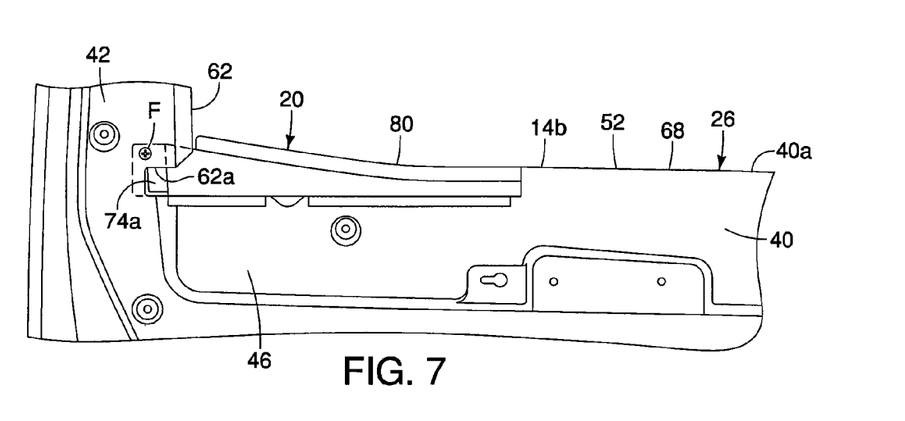
FIG. 7 is a side view of the portion of the inner panel of the door similar to FIG. 6, showing the support bracket installed within the glass installation slot in accordance with the one embodiment.

As shown in FIG. 3, the second edge portion 54 is located vertically below the inclined section 16b of the window opening 14a of the outer panel 24. As shown in FIGS. 4, 6 and 7, the upright edge portion 56 extends in a vertical direction between the second edge portion 54 and the first edge portion 52 of the lower panel portion 40.

Figure 5:
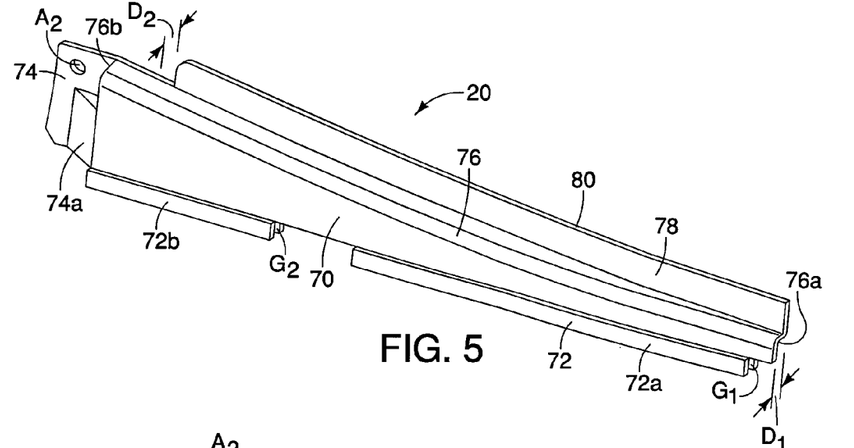
FIG. 5 is a perspective view of the support bracket shown removed from the inner panel in accordance with the one embodiment.

A description of the support bracket 20 is now provided with specific reference to FIG. 5. The support bracket 20 is preferably made of a metallic material, rigid plastic, or rigid polymer material. The support bracket 20 is shaped and configured to be removably attached to the inner panel 26 substantially filling the glass installation slot 58. The support bracket 20 includes a main body section 70, lower section 72, an attachment projection 74, a contoured section 76 and a lip extension 78 (an upper section).

Figure 12:
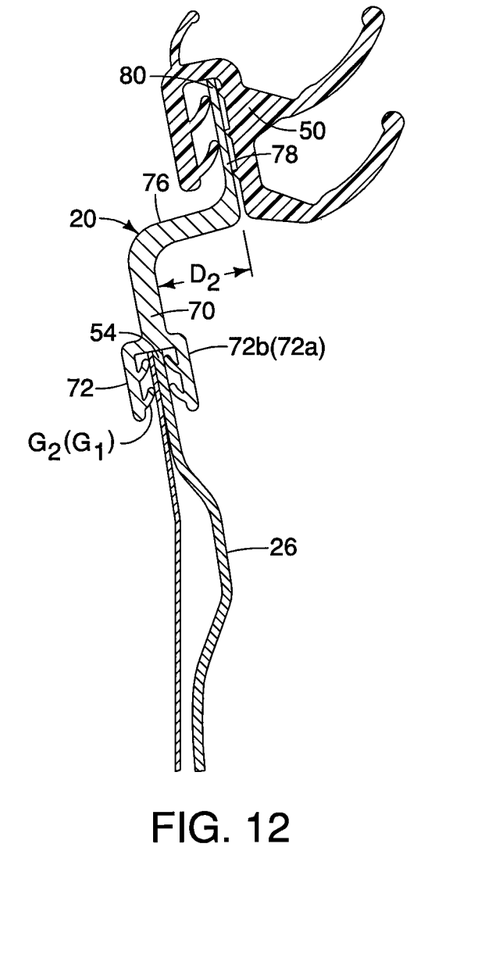
FIG. 12 is a cross-sectional view of a portion of the inner panel, the support bracket and the seal member taken along the line 12-12 in FIG. 8 in accordance with the one embodiment.

The main body section 70 is a generally flat or planar portion of the support bracket 20. The main body section 70 is vertically oriented when installed to the glass installation slot 58, as shown in FIG. 12. However, the main body section has a lengthwise dimension measured horizontally when installed to the glass installation slot 58.

Figure 10:
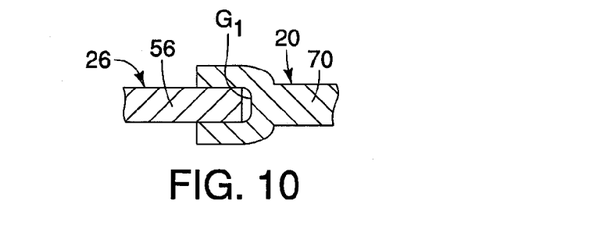
FIG. 10 is a cross-sectional view of a portion of the inner panel and the support bracket taken along the line 10-10 in FIG. 8 in accordance with the one embodiment.
Figure 11:
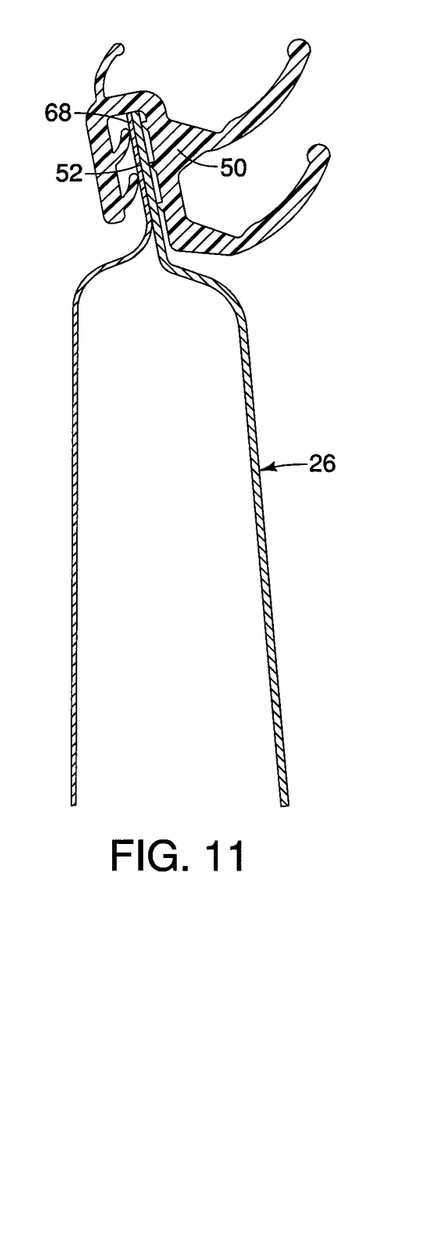
FIG. 11 is a cross-sectional view of a portion of the inner panel and seal member taken along the line 11-11 in FIG. 8 in accordance with the one embodiment.

The lower section 72 includes a first set 72a and a second set 72b of parallel downwardly extending projections located along a lower periphery of the main body section 70. The first and second sets 72a and 72b define inverted U-shaped channels or grooves $G_1$ and $G_2$. More specifically, the groove $G_1$ is defined between the first set 72a of parallel projections and the groove $G_2$ is defined between the second set 72b of parallel projections. When the support bracket 20 is installed to the glass installation slot 58, the upright edge portion 56 extends into one end of the channel or groove $G_1$, as shown in FIG. 10. Further, when the support bracket 20 is installed to the glass installation slot 58, the second edge portion 54 extends into both the groove $G_1$ and the groove $G_2$ such that the support bracket 20 is at least partially covering the second edge portion 56 of the lower panel portion 40 of the inner panel 26, as shown in FIG. 12.

The attachment projection 74 extends rearward from the main body section 70 of the support bracket 20. The attachment projection 74 includes an alignment bump-out 74a that is dimensioned to fit into the recess 62a at the intersection of the rear side 62 of the window opening 14b and the second edge section 54. Contact between the attachment projection 74 and the surfaces that define the recess 62a serve to retain the support bracket 20 in position when installed to the glass installation slot 58. The attachment projection 74 also includes a second aperture $A_2$ that aligns with the first aperture $A_1$ when the support bracket 20 is installed to the glass installation slot 58. A fastener F is inserted into the first and second apertures $A_1$ and $A_2$ to retain the support bracket 20 in the glass installation slot 58.

The contoured section 76 extends between the main body section 70 and the lip extension 78. The contoured section 76 is shaped and dimensioned such that the lip extension 78 gradually becomes horizontally offset from the main body section 70 as one moves from a first end 76a to a second end 76b of the contoured section 76. In other words, at the first end 76a, the lip extension 76 is only slightly offset in a horizontal direction by a first distance $D_1$ from the main body section 70. However, at the second end 76b, the lip extension 76 is horizontally offset from the main body section 70 by a second distance $D_2$ that is greater than the distance $D_1$.

Figure 8:
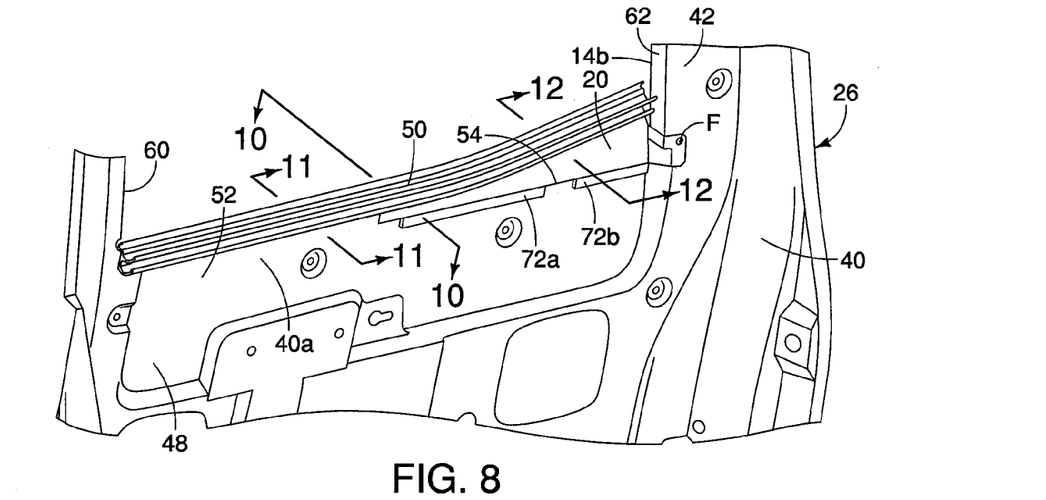
FIG. 8 is a perspective view of the inner panel with the support bracket and the seal member installed in accordance with the one embodiment.
Figure 9:
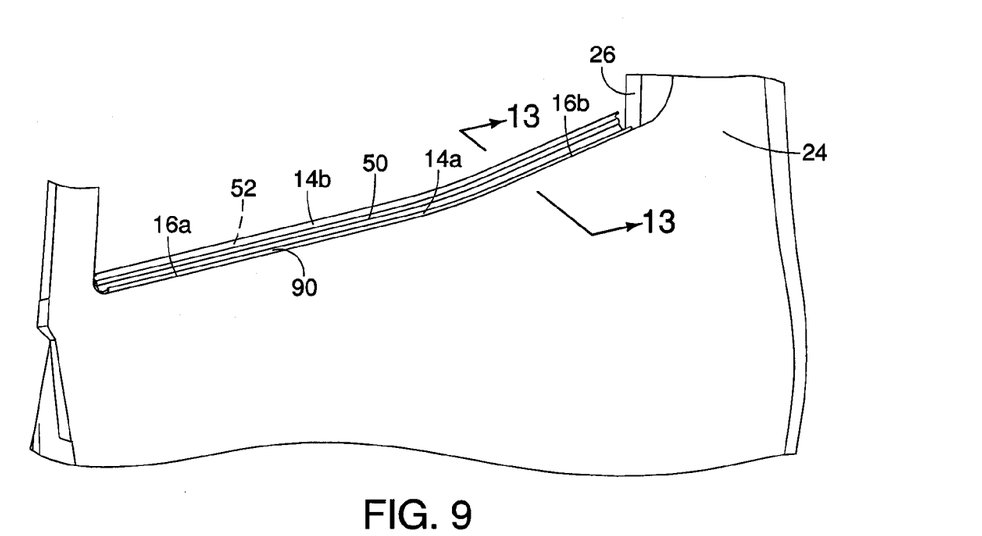
FIG. 9 is a perspective view of the inner panel and the outer panel of the door showing the seam member in alignment with the non-linear lower edge of the window opening of the outer panel in accordance with the one embodiment.

The lip extension 78 extends upward from the contoured section 76 of the support bracket 20 and defines a second seal supporting lip 80. The lip extension 78 is positioned and shaped such that the second seal supporting lip 80 is aligned with the first seal supporting lip 68. Further, the second seal supporting lip 80 curves upward approaching the second side 62 of the window opening 14b, as shown in FIG. 8. In other words, the first seal supporting lip 68 and the second seal supporting lip 80 form an almost continuous lip that supports the seal member 50. More specifically, the first seal supporting lip 68 and the second seal supporting lip 80 define an overall shape of the lower periphery of the window opening 14b. Further, as shown in FIG. 9, the lower periphery of the window opening 14b and the lower periphery of the window opening 14a are parallel to one another.

The seal member 50 is installed to the first seal supporting lip 68 and the second seal supporting lip 80 extending from the first (front) side 60 of the window opening 14b to the second (rear) side 62 of the window opening 14b.

Figure 13:
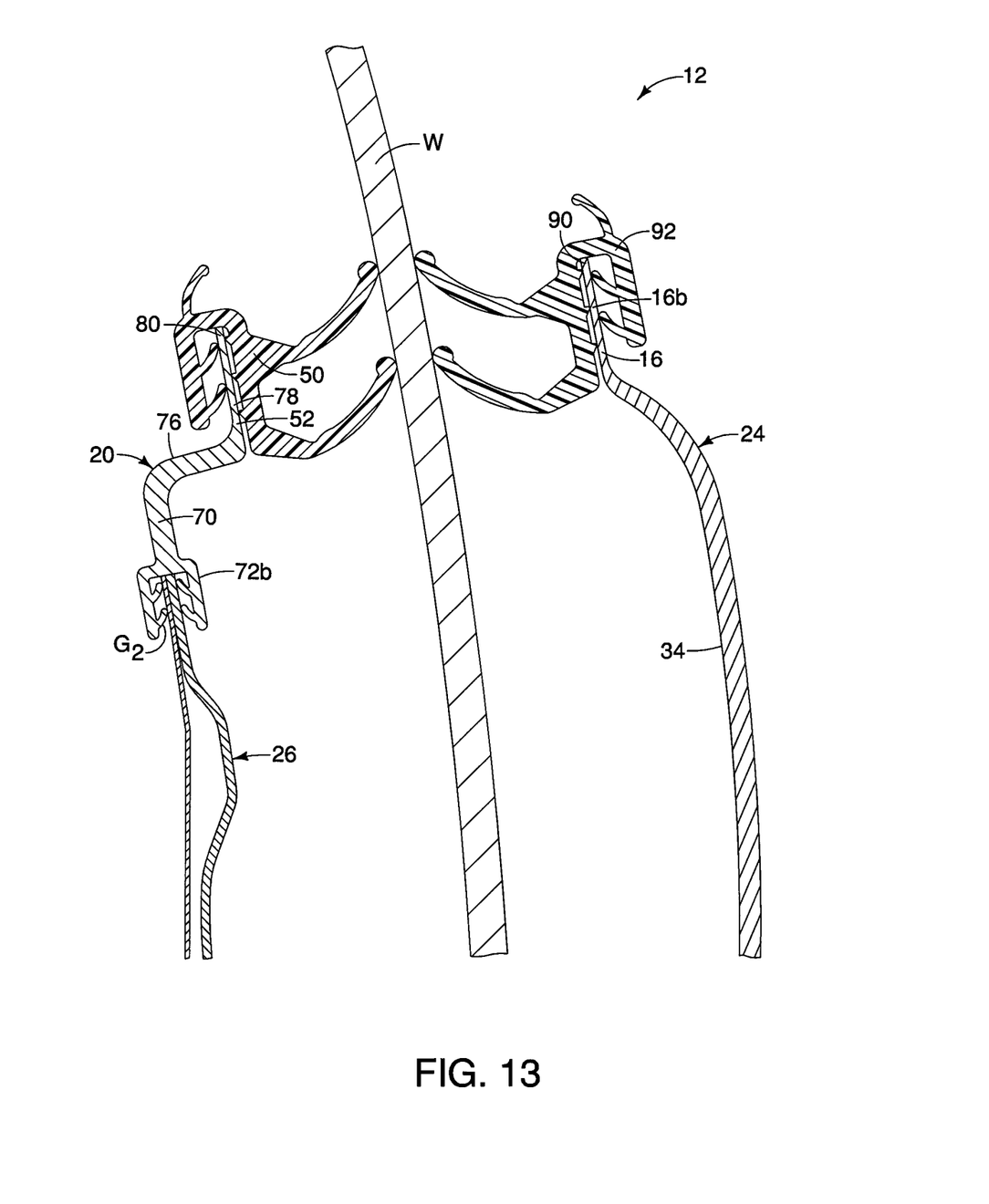
FIG. 13 is a cross-sectional view of a portion of the door of the vehicle taken along the line 13-13 in FIG. 9 showing the inner panel, the support bracket, the seal member, the outer panel and an outer seal member in accordance with the one embodiment.

As shown in FIG. 13, the outer door panel 24 includes a seal supporting lip 90 that is formed at the non-linear bottom end 16 of the window opening 14a. A seal member 92 is installed to the seal supporting lip 90. The seal supporting lip 90 is spaced apart from the first seal supporting lip 68 and the second seal supporting lip 80. Further, the seal member 50 and the seal member 92 are also spaced apart from one another with the window glass W being moveably supported between the outer panel 24 and the inner panel 26. Further, the seal member 50 is supported on one side of the window glass W and the seal member 90 is supported on the other side of the window glass W such that the seal member 50 contacts the one side of the window glass W and the seal member 92 contacts the other side of the window glass W.

As shown in FIG. 4, the window glass W is larger than the window opening 14b. The window glass W is typically installed to the door 12 from an interior side of the door 12 (the side of the door 12 adjacent to the inner panel 26). However, since the door 12 has the window opening 14 with the non-linear bottom end 16, installing and removing the window glass W from the door 12 can be a challenge. Specifically, the upwardly inclined shape of the inclined section 16b of the window opening 14a, when imposed on the inner panel 26, presents geometric problems. Specifically, with the inclined section 16b present on the inner door panel 26, it can be extremely difficult, if not impossible to simply and efficiently install or remove the window glass W to and from the door 12. Hence, the inner panel 26 is provided with the glass installation slot 58 in order to provide sufficient space to install and/or remove the window glass W from the door 12. In the absence of the support bracket 20, the seal member 50 would not be adequately supported with respect to providing a reliable seal against the window glass W. Additionally, the substantially continuous lip formed by the first seal supporting lip 68 and the second seal supporting lip 80 allow installation of a singular seal member 50 to provide a continuous seal against the window glass W from the first (front) side 60 to the second (rear) side 62.

In order to provide the seal member 50 with sufficient rigidity when installed to the inner panel 26, the support bracket 20 is provided to cover the glass installation slot 58. The support bracket 20 is a rigid member that securely and rigidly connects to the inner panel 26. Specifically, the lower section 72 includes the grooves $G_1$ and $G_2$ that receive the second edges portion 54 and the upright edge portion 56, thereby preventing movement in directions perpendicular to the grooves $G_1$ and $G_2$. Further, the fastener F secures the attachment projection 74 to the upper window support portion 42 of the inner panel 26. As well, the bump-out 74a within the recess 62a prevents vertical movement of the support bracket 20 with the support bracket 20 installed to the inner panel 26.

Thus, the support bracket 20 extends the first seal supporting lip 68 by providing the second seal supporting lip 80 thereby rigidly supporting the seal member 50 along its entire length from the first (front) side 60 to the second (rear) side 62 of the window opening 14.

The vehicle 10 and the door 12 (other than the support bracket 20) include a variety of elements and components that are conventional components that are well known in the art. Since these elements and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle door structure. Accordingly, these terms, as utilized to describe the present invention should be interpreted relative to a vehicle equipped with the vehicle door structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door structure comprising:
   a first panel at least partially defining a first window opening and having a first edge portion extending along a lower periphery of the first window opening from a first side toward a second side of the first window opening, the first window opening defining a lengthwise direction that is horizontally oriented, the first edge portion defining a seal supporting lip and a glass installation slot, the seal supporting lip extending in the lengthwise direction from the first side of the first window opening toward the second side of the first window opening to a terminal end of the seal supporting lip that is spaced apart in the lengthwise direction from the second side of the first window opening, the glass installation slot beginning at the terminal end of the seal supporting lip and ending proximate the second side of the first window opening; and
   a support bracket removably attached to the first panel substantially filling the glass installation slot, the support bracket having a lip extension aligned with the seal supporting lip that extends in the lengthwise direction from the terminal end of the seal supporting lip to the second side of the first window opening.

2. The vehicle door structure according to claim 1, wherein the seal supporting lip and the lip extension define an overall shape of the lower periphery of the first window opening.

3. The vehicle door structure according to claim 2, wherein the seal supporting lip extends horizontally and the lip extension curves upward approaching the second side of the first window opening.

4. The vehicle door structure according to claim 1, wherein the first panel is an inner door panel that includes a main body extending downward from the first edge portion of the first window opening, and
   the first edge portion has a first section that defines the seal supporting lip and a second section defining at least a portion of the glass installation slot, the first section and the second section offset from one another relative to a horizontal direction as viewed in a cross-section of the first panel.

5. The vehicle door structure according to claim 4, wherein the support bracket includes a lower section and an upper section, the lower section having an inverted U-shaped channel that covers the second section of the first edge portion of the first panel, the upper section defining the lip extension and being offset from the lower section in the horizontal direction as viewed in the cross-section of the first panel.

6. The vehicle door structure according to claim 1, wherein the support bracket is removably attached to the first panel via at least one mechanical fastener.

7. The vehicle door structure according to claim 1, further comprising
   a first seal member installed to the seal supporting lip and the lip extension along the lower periphery of the first window opening extending from the first side of the first window opening to the second side of the first window opening.

8. A vehicle door structure comprising
   a first panel at least partially defining a first window opening and having a first edge portion extending along a lower periphery of the first window opening from a first side toward a second side of the first window opening, the first edge portion defining a seal supporting lip and a glass installation slot, the seal supporting lip extending from the first side of the first window opening toward the second side of the first window opening to a terminal end of the seal supporting lip that is spaced apart from the second side of the first window opening, the glass installation slot beginning at the terminal end of the seal supporting lip and ending proximate the second side of the first window opening;
   a support bracket removably attached to the first panel substantially filling the glass installation slot, the support bracket having a lip extension aligned with the seal supporting lip that extends from the terminal end of the seal supporting lip to the second side of the first window opening; and
   a second panel defining a second window opening aligned with the first window opening with the second panel being fixedly attached to the first panel, the second panel having a second edge portion extending along a lower periphery of the second window opening from a first side to a second side of the second window opening, the second edge portion defining a second seal supporting lip that extends from the first side of the second window opening to the second side of the second window opening.

9. The vehicle door structure according to claim 8, wherein
the second seal supporting lip has a first portion that extends horizontally along a corresponding first portion of a lower periphery of the second window opening and a second portion that curves upward approaching the second side of the second window opening.

10. The vehicle door structure according to claim 9, wherein
the second seal supporting lip defines an overall shape of the lower periphery of the second window opening.

11. The vehicle door structure according to claim 10, wherein
the seal supporting lip and the lip extension define an overall shape of the lower periphery of the first window opening paralleling the second seal supporting lip.

12. The vehicle door structure according to claim 8, wherein
the second seal supporting lip is spaced apart from the seal supporting lip and the lip extension.

13. The vehicle door structure according to claim 12, further comprising
a window glass moveably supported between the first panel and the second panel, with the seal supporting lip being located on a first side of the window glass and the second seal supporting lip and the lip extension being on a second side of the window glass.

14. The vehicle door structure according to claim 13, further comprising
a first seal member installed to the seal supporting lip and the lip extension contacting the first side of the window glass; and
a second seal member installed to the second seal supporting lip contacting the second side of the window glass.

15. The vehicle door structure according to claim 8, wherein
the first panel is an inner door panel and the second panel is an outer door panel.

16. The vehicle door structure according to claim 1, wherein
the seal supporting lip and the lip extension define a lower edge of the first window opening.

17. The vehicle door structure according to claim 8, wherein
the seal supporting lip and the lip extension define a lower edge of the first window opening.

18. The vehicle door structure according to claim 8, further comprising
a first seal member installed to the seal supporting lip and the lip extension along the lower periphery of the first window opening extending from the first side of the first window opening to the second side of the first window opening.

19. A vehicle door structure comprising:
a first panel at least partially defining a first window opening and having a first edge portion extending along a lower periphery of the first window opening from a first side toward a second side of the first window opening, the first edge portion defining a seal supporting lip and a glass installation slot, the seal supporting lip extending from the first side of the first window opening toward the second side of the first window opening to a terminal end of the seal supporting lip that is spaced apart from the second side of the first window opening, the glass installation slot beginning at the terminal end of the seal supporting lip and ending proximate the second side of the first window opening; and
a support bracket removably attached to the first panel substantially filling the glass installation slot, the support bracket having a lip extension aligned with the seal supporting lip that extends from the terminal end of the seal supporting lip to the second side of the first window opening, the seal supporting lip and the lip extension define a lower edge of the first window opening.

20. The vehicle door structure according to claim 19, further comprising
a first seal member installed to the seal supporting lip and the lip extension extending from the first side of the first window opening to the second side of the first window opening.

* * * * *